United States Patent [19]

Dooley

[11] Patent Number: 4,815,760

[45] Date of Patent: Mar. 28, 1989

[54] UNDERCARRIAGE ARRANGEMENT FOR NORMALLY STATIC ARTICLES

[76] Inventor: Joseph Dooley, "Bankside", Station Road, Thurstaston, Wirral, Merseyside L61 0HN, England

[21] Appl. No.: 87,148

[22] PCT Filed: Dec. 18, 1986

[86] PCT No.: PCT/GB86/00774

§ 371 Date: Aug. 17, 1987

§ 102(e) Date: Aug. 17, 1987

[87] PCT Pub. No.: WO87/03949

PCT Pub. Date: Jul. 2, 1987

[30] Foreign Application Priority Data

Dec. 21, 1985 [GB] United Kingdom ............... 8531549

[51] Int. Cl.⁴ .............................................. B60S 9/14
[52] U.S. Cl. .............................. 280/43.24; 280/47.131
[58] Field of Search ................ 280/43.1, 43.17, 43.24, 280/43.18, 47.34, 43.22, 64, 763.1, 764.1, 47.13 R, 47.18, 47.2

[56] References Cited

U.S. PATENT DOCUMENTS 3,260,533 7/1966 Ryder ................................ 280/43.1
4,008,507 2/1977 Smith ............................... 280/43.24

FOREIGN PATENT DOCUMENTS 2407013 8/1975 Fed. Rep. of Germany .
8505829 6/1985 Fed. Rep. of Germany .
1008824 5/1952 France .
2128254 10/1972 France .
279879 12/1951 Switzerland .
606535 8/1948 United Kingdom .

Primary Examiner—David M. Mitchell
Assistant Examiner—Richard Camby

[57] ABSTRACT

An undercarriage arrangement for normally static objects such as work-benches comprises at least one pair of wheels or rollers (5) which are mounted for rotation on at least one support member (6) pivotably mountable on the object (1, 2, 3, 4). A spring biassing arrangement is provided, one end of the spring (11) being pivotally mounted (at 12) on the support member (6) and the other end thereof being attached to member (8) mounted on the object (1, 2, 3, 4). The member (8) may comprise a pivotal lever (8) or projections. In either case, the second end of the spring (11) can be displaced between two or more pre-selected positions with the proviso that at least two of the pre-selected positions are disposed on opposed sides of a vertical plane passing through the pivot axis (7) for at least one support member (6). The two end positions for the second end of the spring (11) are so selected that in one position the wheels (5) are located generally above the lowermost portion of the object (1, 2, 3, 4) and in the other position are located generally below the lowermost portion of the object (1, 2, 3, 4). The displacement of the second end of the spring (11) thus enables any static object to which the arrangement is fitted to be transposed from a conventional static mode into a transportation mode and, once transported returned to its conventional static mode.

7 Claims, 2 Drawing Sheets

UNDERCARRIAGE ARRANGEMENT FOR NORMALLY STATIC ARTICLES

FIELD OF THE INVENTION

The present invention relates to an undercarriage arrangement which is capable of being affixed to a heavy, normally static, item and to an article provided with such undercarriage. Primarily, but not essentially, the present invention relates to an undercarriage which can be affixed to a work-bench so as to allow the work-bench to be moved to adjacent the site where work is to be effected and, once in such position, for the work-bench to be rendered static.

BACKGROUND OF THE INVENTION AND PRIOR ART DISCUSSION

Work-benches for private and industrial use are, of course, well known. Such work-benches are usually provided with drawers in which tools, equipment and other hardware may be stored. In addition, many work-benches have equipment such as vices fitted thereto. Once laden and fitted, a work-bench assembly is relatively heavy. Moreover, because much of the work carried out on a work-bench must be effected within fine tolerances, it is essential that the work-bench is stable.

For this reason, most work-benches are free standing or are fixedly supported on or against an immovable object such as a floor or wall and, once located in their desired position, are not intended to be moved. Accordingly, in locations such as garage workshops, work-benches tend to be located around the periphery of the workshop.

The vehicles upon which work is to be effected are then driven into the central area of the workshop and the mechanic carries out the necessary work on the vehicle. In most cases, this means that the vehicle upon which work is to be carried out is in one location and the mechanic's tools and equipment are in a second location. For example, it may be necessary for a mechanic to carry out a machining operation on a vehicle component. This cannot usually be effected in situ. The mechanic must, therefore, remove the part from the vehicle, carry it to his work-bench, carry out the necessary mahining operation, return it to the vehicle and refit the machined component. If the machining operation is successful at the first attempt, no major problems arise. However, as aforementioned, many tasks must be effected within extremely fine tolerances and it is by no means unusual for a mechanic to have to carry out the above-described cycle two or three times. The need for carrying the workpiece from the vehicle to the work-bench and back to the vehicle on a number of occasions can prove extremely vexatious. Moreover, it must be appreciated that many vehicle components are relatively heavy and the continued carrying of such workpieces across the workshop is fatiguing to the mechanic and can lead to accidents occurring. Accordingly, it is highly desirable if the work-bench is located as close as possible to the vehicle upon which work is to be effected.

Merely locating conventional static work-benches adjacent the intended location of a vehicle upon which work is to be carried out is generally wasteful of space. Another alternative would be merely to provide the workbench with wheels to enable it to be moved around the workshop. However, this, in itself, is not a solution to the problem. If the work-bench is simply mounted on wheels, it will not remain static and stable whilst operations are being carried out thereon. It would therefore be necessary to chock the wheels once the work-bench is located in its desired position, or for a brake arrangement to be provided. Chocking the wheels is not an ideal solution and the use of a brake arrangement is also not entirely satisfactory. Workshop floors are, by their very nature, not the cleanest of places and extremely regular maintenance of the brakes would be necessary to ensure their continued satisfactory operation.

Undercarriages are known which permit heavy objects which are normally static to be moved and, once located in their desired new position, to be rendered static once more. However, most of these known arrangements are mounted directly on the underside of the object and are located extremely close to ground level. for example, such an arrangement is known for permitting household appliances such as cookers, to be moved so that the floor beneath and behind the cooker can be cleaned. However, household kitchens are usually much cleaner than workshop floors and the low level location of such undercarriage devices does not give rise to undue maintenance problems.

OBJECTS OF THE INVENTION

Accordingly, the present invention seeks to provide an undercarriage arrangement which can be simply and quickly fitted to a heavy, normally static object, such as a work-bench, so as to make it possible to displace the heavy object to a desired location and, once in such desired location, for the heavy object to be rendered static and stable. In a subsidiary aspect, the present invention seeks to provide an undercarriage arrangement which is suitable for use in a workshop environment which does not suffer from the disadvantages of know arrangements.

SUMMARY OF THE INVENTION

According to the present invention there is provided an undercarriage arrangement comprising at least one pair of wheels or rollers rotatably mounted on at least one support member, the support member being displaceably mountable on an article to be fitted with the undercarriage, spring biasing means having a first end region pivotally mounted on at least one of the support members and a second end region, and means mountable on the article to be provided with the undercarriage for receiving the second end region of the spring means, whereby the second end region of the spring means is locatable in at least two preselected positions, at least two of the preselected positions being disposed on opposed sides of a vertical plane passing through the means for pivotally mounting at least one support member.

Preferably, each support member is in the form of an arm member carrying mounting means, the mounting means being capable of being pivotally mounted on an article to be fitted with the undercarriage. Alternatively, the support member comprises an axle common to the wheels in each pair, the ends of the axle being displaceably guidable in a slotted guide member mounted on the article. In such a case, the slots are preferably U- or V-shaped with arms of unequal length.

In a particularly simple embodiment of the present invention, the means mountable on the article for receiving the second end of the spring comprise simple projection members, the second end of the spring being provided with an end portion cooperable with the projection. Such an arrangement necessitates, in use, the manual removal of the second end region of the spring from one projection member and its affixation into or onto the second projection member.

However, in a more preferred arrangement, the second end region of the spring is affixed to a pivotal level arrangement. The pivotal lever advantageously shares a common pivot axis with one of the arm members. In such a case, it is desirable if the free end of the lever arrangement terminates in a handle member and the mounting point for the second end region of the spring is located intermediate the ends of the lever arrangement.

If such a lever arrangement is provided, it is desirable to provide stop members mountable on the article to limit the pivotal movement of the lever arrangement.

Due to the pivotal mounting of the arm members, it will be readily apparent that it is preferably to limit the amount of such pivotal movement. Accordingly, in a desired embodiment of the present invention, the arm members carry stop members which, in use, strike against the underside of the article, thereby preventing further pivotal movement of the arm members and wheels in that direction.

For reasons which will become apparent hereinafter, the stop members preferably comprise a pair of plates mounted on opposed sides of at least one of the arm members. Although the members could possibly be of the same size, they are preferably of different sizes and are offset relative to one another.

Also according to the present invention there is provided a work-bench which has such an undercarriage arrangement detachably or permanently affixed thereto. It is desirable if the work-bench comprises a work surface mounted on a support arrangement, at least one portion of the work surface protruding beyond the support.

BRIEF DESCRIPTION OF THE DRAWINGS

The invention will be further described, by way of example, with reference to the accompanying drawings, in which.

DESCRIPTION OF THE PREFERRED EMBODIMENTS

Figure 1:
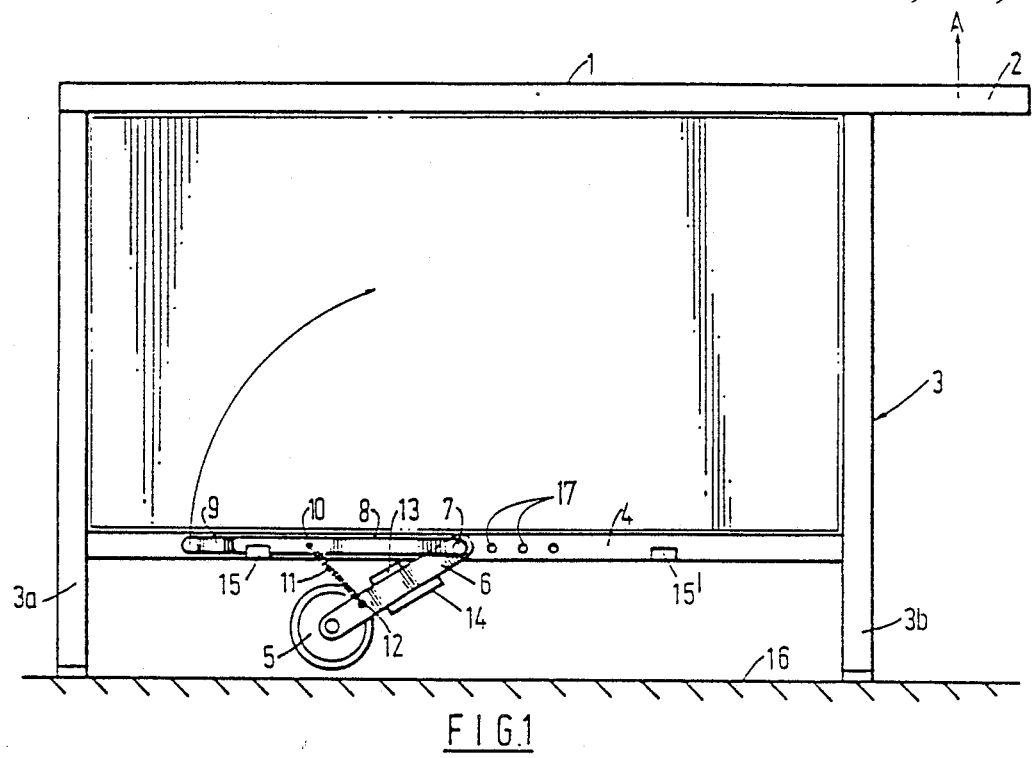
FIG. 1 is a schematic side elevation of an undercarriage assembly in accordance with the present invention fitted to a work-bench and in a first position of use.
Figure 2:
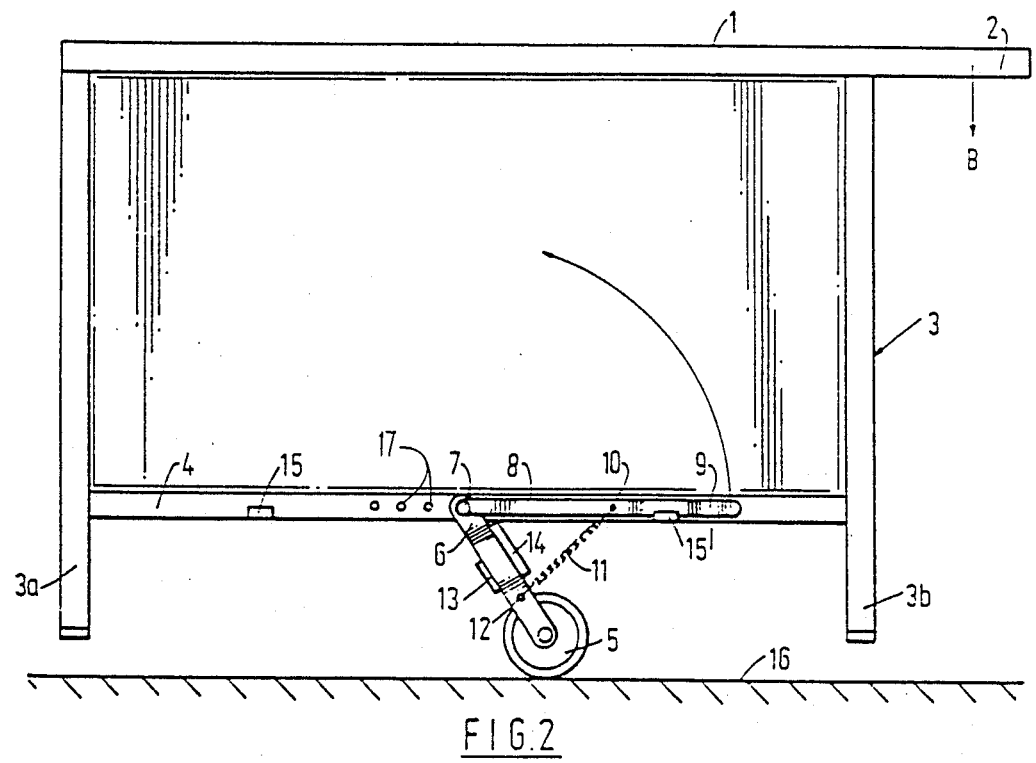
FIG. 2 is a view similar to FIG. 1 but showing the undercarriage arrangement in its second position of use.
Figure 3:
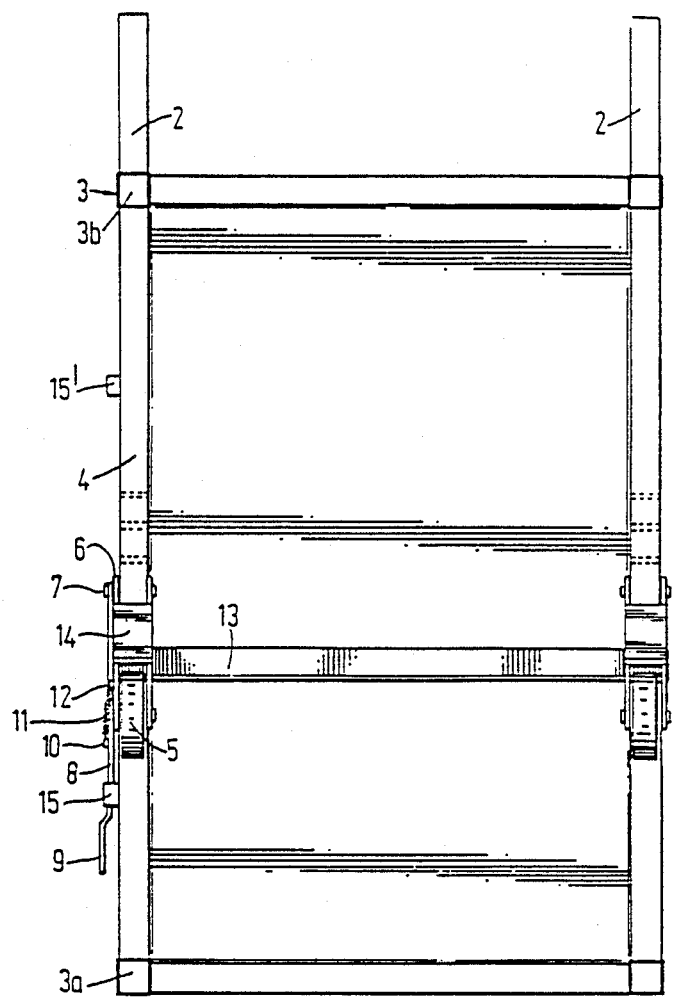
FIG. 3 is an underneath plan view of the undercarriage arrangement shown in FIGS. 1 to 2.

In FIGS. 1 and 2 of the drawings, there is shown a work-bench comprising a work surface 1 mounted on a support structure 3. The work-bench 1 includes a portion 2 which projects laterally beyond the support structure 3. The reason for the provision of this projecting portion 2 will become apparent hereinafter. Mounted on a lower portion 4 of the support structure 3 is an undercarriage arrangement in accordance with the present invention.

The undercarriage arrangement comprises at least one pair of wheels or rollers 5, each wheel being rotatably mounted on an arm member 6. Only one such wheel 5 and arm assembly 6 is visible in the drawings. However, it should be appreciated that a wheel and arm assembly is provided on each side of the support structure 3. The arm assemblies 6 are each mounted, on the lower support member 4, by a stub axle 7 which acts as a pivot axis for the assembly 6.

Independently pivotally mounted on the axes 7 is a lever arrangement 8. At its free end, the lever arrangement 8 includes a handle portion 9. Intermediate the ends of the lever arrangement 8, there is provided a pivotal mounting 10 which receives one end region of a tension spring 11. The other end region of the spring 11 is pivotally mounted, at 12, on the arm assembly 6 in a region thereof adjacent the rotatable mounting of the wheel 5.

On opposed sides of the arm member 6, stop members 13 and 14 are provided. It will be observed that, in the position shown in FIG. 1 the stop member 13 is in abutment with the support portion 4, whilst, in the position shown in FIG. 2, the stop member 14 is in abutment with such support member 4. The two stop members 13 and 14 are of different sizes and are offset relative to one another. The reason for this will also become apparent hereinafter.

On the support portion 4, retaining members 15 are provided. These retaining member 15 act as stop members for limiting the pivotal movement of the lever arrangement 8 about its pivot axis 7.

The method of use of the undercarriage arrangement of the present invention will now be described. For simplicity of explanation, it will be assumed that the undercarriage is initially in the position shown in FIG. 1. In this position, the lever 8 extends horizontally towards the left (as shown) and is supported in the retaining member 15. The pivotal mounting 10 on the lever 8 for the spring 11, is, accordingly, also to the left of the pivot ais 7. The force of the spring will, therefore, tend to rotate the arm member 6 and the wheel 5 associated therewith in a clockwise direction. The strength of the spring is so selected as to overcome the mass of the wheel 5 and the arm member 6. Accordingly, the wheel 5 will be raised from the g round 6. This clockwise movement of the arm member 6 will continue until the stop member 13 comes into abutment with the lower support member 4. Because the wheel 5 has been raised, the support member 3 has effectively been lowered and the front and rear leg members 3a and 3b respectively will rest in abutment with the ground 16. Accordingly, in the position shown in FIG. 1, the work-bench arrangement 1, 3 is both static and stable. According it may be used in the same manner as a conventional static work bench.

It will now be assumed that it is desired to move the work bench assembly 1, 3 to a different location. To achieve this, it is firstly necessary to rotate the lever arrangement 8 through 180° about its pivot axis 7. The lever arrangement 8 is shown, in FIG. 2, resting in the second retaining member 15' to the right (as shown) of the pivot axis 7. Movement of the lever assembly 8 will, of course, displace the pivotal mounting 10 for the spring 11. Once the lever arrangement is located in the position shown in FIG. 2, the force of the spring will tend to pull the arm member 6 and wheel associated therewith in an anti-clockwise direction. Although a limited amount of movement of the arm member 6 and wheel 5 will take place, the wheel will quickly strike the ground and such pivotal movement will cease. However, it will be appreciated that the spring 11 will, at such time, still be under tension.

To permit further anti-clockwise pivotal movement of the arm member 6 and the wheel 5 about the pivot axis 7, the work-bench arrangement 1, 3 must be raised slightly in the direction of arrow A shown in FIG. 1 to such an extent that, when the arm member 6 extends vertically downwardly, the wheel 5 rotatably mounted thereon just clears the ground. Such lifting is facilitated by the projecting portion 2 of the work-bench 1 which can be used, effectively, as a handle member. Since the force of the spring is no longer opposed by the fictional force between the wheel and the ground, the arm member 6 and wheel rotatably mounted thereon are free to pivot into the position shown in FIG. 2. Such pivotal movement will continue until the stop member 14 strikes against the lower support member 4.

The stop member 14 is considerably larger than the stop member 13 and also includes a portion which is located nearer to the pivot axis 7 than any part of the stop member 13. Accordingly, the angle subtended a the pivot axis 7 by the arm member 6 and the lower support member 4 when the stop member 14 is in abutment with the lower support member 4 is greater than is the case when the stop member 13 is in abutment with such lower support member 4. Accordingly, in the position shown in FIG. 2, the pair of wheels have effectively been lowered and hence the work-bench assembly 1, 3 has, effectively been raised. It will, of course, be appreciated that the assembly is not shown in a stable position as shown in FIG. 2. The stable position would be with the wheels 5 and the front legs 3a in contact with the ground whilst the rear legs 3b are raised clear of the ground. However, using the projecting portion 2 of work-bench 1 as a load point and by the application of a downward force in the direction of the arrow B shown in FIG. 2, the work-bench assembly is moved in the position shown in FIG. 2 in which it is supported on the ground solely by means of the wheels 5. The work-bench assembly 1, 3 can now be displaced, with steering, to a desired new location. Once in the desired location, the lever assembly 8 is returned to the position shown in FIG. 1, the work-bench is lifted and the entire undercarriage returns to the position shown in FIG. 1. The work-bench is, at such time, ready for use in its new location.

The main reason why the stop member 14 is larger than the stop member 13 is because it is desirable that only minimal pivotal movement of the arm member 6 should be possible once the wheels 5 are located on the ground. Moreover, if the arrangement strikes an obstruction whilst it is being moved to a new location, the force of the spring would otherwise tend to raise the wheels, thereby halting forward movement.

It will be readily appreciated that only one of the arm members and wheels requires a spring and lever assembly connected thereto. It will be readily apparent that if a fixed connection is provided between the arm members, the arm member and wheel not shown in the drawings will be caused to follow a path parallel to the arm member and wheel having the spring and lever arrangement attached thereto. Although not shown in the drawings, this could be achieved by providing a single stop member 13 which extends from one arm member to the other.

It will also be readily apparent that various minor modifications can be made to the undercarriage arrangement of the present invention without departing from the scope thereof. Thus, for example, the lever arrangement could simply be replaced by providing at least two projection members 17 on the lower support member 4. These projection members merely need to be capable of retaining the second end region of the spring. The two projections members, in such a case, would be disposed one on either side of the pivot axis 7. In such an arrangement, the mechanic would simply unhook the end of the spring from one projection member and locate it on the other projection member, instead of rotating the lever through 180°.

Furthermore, the undercarriage arrangement could comprise a plurality of pairs of wheels. It should, however, be pointed out that if more than one pair of wheels is provided, one such pair would need to be steerable. Still further, the lower support member 4 could be provided with a plurality of throughbores so that the location of the pivot axis 7 can be selected by the user. Such an arrangement is desirable because equipped and laden work-benches tend to have a centre of gravity which is not located on the medial plane of the work-bench. By suitably adjusting the location of the pivot axis 7, the lifting of the work-bench by means of the projecting portion 2 can be facilitated. It will, of course, be appreciated that the projecting portion 2 of the work-bench arrangement could merely be a handlebar type arrangement. In such circumstances, it would be possible to provide a separate insert member locatable between the arms of, or internally of, the handlebar arrangement. By so doing, once the work-bench arrangement has been moved into its desired location, the insert member can be added thereby increasing the useful work-surface of the work-bench. Finally, instead of providing the work-surface 1 with a projecting portion 2, a handlebar assembly, suitably shaped, could be integrally formed with or detachably affixed to the lower support member 4.

Finally, the wheels 6 could be interconnected by means of a common axle. In such a case, plate members which extend downwardly are fixedly mounted on the lower support member 4 of the work-bench 1. In each plate member, a substantially U- or V-shaped slot is provided in which the axle is guidably displaced. The arms of the U or V are of unequal length and it can readily be seen that, if the spring is connected to one end of the axle, the wheels may effectively be raised and lowered by the lever arrangement described hereinafter.

What is claimed is:
1. An undercarriage arrangement for fitment to a normally static article comprising:
at least one pair of wheels or rollers; wheel support means rotatably mounting said wheels or
rollers, said wheel support means comprising an arm member extending rectilinearly and having opposed first and second end regions, said first end region carrying rotatable axle means mounting said wheel and said second end region carrying joint means mountable mounted on said article for pivoting said arm member with respect to said article,
stop means mounted on said arm member said pivotal movement by contact of said stop means with said article, and
spring biasing means for effecting pivotal movement of said are member, said spring biasing means including first and second end regions, said first end region of said spring biasing means carrying mounting means mounted on said arm member intermediate said first and second end regions of said arm member and said second end region of said spring biasing means mounted on a locating means attached to said article for locating said second end region at preselected positions disposed on opposed sides of the vertical plane passing through said pivotal mounting of said arm member on said article, said undercarriage has two stable states limited by said stop means and, in each stable state, both end regions of said spring biasing means are disposed on the same side of the said vertical plane, said wheels or rollers being disposed on said same side of said vertical plane as said end regions of said spring biasing means.

2. An undercarriage arrangement as recited in claim 1 wherein said locating means comprising lever means, said lever means including opposed first and second end regions, said first end region including means mounting said lever means on said pivot means for said wheel support means and said second end region forming handle means for pivoting said lever means, said lever means further including means mounting said second end of said spring disposed intermediate said first and second end regions of said lever means, said lever means being pivotable about said pivot axis through an angle of up to about 180°.

3. An undercarriage arrangement as recited in claim 2 additionally comprising further stop members mountable on said article for limiting said pivotal movement of said operating lever means.

4. An undercarriage arrangement as recited in claim 1 wherein said second end region of said spring biasing means includes hook means forming said locating means, said article including a plurality of aligned projection members for receiving said hook means, at least two of said projection members being disposed on opposed sides of said vertical plane passing through said pivotal mounting of said wheel support means.

5. An undercarriage arrangement as recited in claim 1 wherein said stop means comprise plate members, said plate members being of different sizes and being offset with respect to one another.

6. An undercarriage arrangement as recited in claim 1 wherein said wheel support means further includes rigid means interconnecting said arm members.

7. An undercarriage arrangement as recited in claim 1 wherein the arm members have opposed first and second major surface, and the stop means is mounted on one of the major surfaces.

* * * * *